(12) United States Patent
Yang et al.

(10) Patent No.: US 11,094,968 B2
(45) Date of Patent: Aug. 17, 2021

(54) BATTERY CELL COMPRISING PROTECTION CIRCUIT MODULE ASSEMBLY HAVING LEAD PLATE

(71) Applicant: LG CHEM, LTD., Seoul (KR)

(72) Inventors: Jin Oh Yang, Daejeon (KR); Young Su Son, Daejeon (KR); Suk Jin Song, Daejeon (KR); Jae Young Jang, Daejeon (KR)

(73) Assignee: LG CHEM, LTD., Seoul (KR)

( * ) Notice: Subject to any disclaimer, the term of this patent is extended or adjusted under 35 U.S.C. 154(b) by 0 days.

(21) Appl. No.: 16/791,233

(22) Filed: Feb. 14, 2020

(65) Prior Publication Data

US 2020/0185785 A1 Jun. 11, 2020

Related U.S. Application Data

(63) Continuation of application No. 15/812,343, filed on Nov. 14, 2017, now Pat. No. 10,658,708.

(30) Foreign Application Priority Data

Nov. 2, 2016 (KR) .......................... 10-2016-0144996

(51) Int. Cl.
*H01M 10/42* (2006.01)
*H01M 50/103* (2021.01)
(Continued)

(52) U.S. Cl.
CPC ..... *H01M 10/425* (2013.01); *H01M 10/0525* (2013.01); *H01M 50/103* (2021.01);
(Continued)

(58) Field of Classification Search
CPC ... H01M 2/021; H01M 10/425; H01M 50/531
(Continued)

(56) References Cited

U.S. PATENT DOCUMENTS 9,040,192 B2    5/2015   Lee et al.
2013/0089755 A1   4/2013   Park et al.
(Continued)

FOREIGN PATENT DOCUMENTS

KR   10-2009-0103404 A   10/2009
KR      10-0933843 B1    12/2009
(Continued)

*Primary Examiner* — James M Erwin
(74) *Attorney, Agent, or Firm* — Birch, Stewart, Kolasch & Birch LLP

(57) ABSTRACT

Provided is a plate-shaped battery cell in which electrode leads are located at one side end portion of a battery case including an excess sealing portion of a thermally-welded or adhesive structure for sealing an electrode assembly. the battery cell includes: a Protection Circuit Module (PCM) assembly having one or more safety elements for preventing overcurrent, wherein the PCM assembly includes a PCM and a conductive lead plate for electrically connecting the electrode leads, wherein the lead plate includes: an electrode lead connection portion positioned at one side end portion of the lead plate for electrically connecting the PCM and the electrode lead; a PCM connection portion located at the other side end portion of the lead plate for connecting to a connection portion of a printed circuit board on which a protection circuit is formed; and a bent portion extending from the electrode lead connection portion to be bent to face the outer surface of the battery case in order to prevent damage to the battery case occurring during a process of connecting the electrode lead to the electrode lead connecting portion.

20 Claims, 5 Drawing Sheets

(51) Int. Cl.
 *H01M 50/116* (2021.01)
 *H01M 50/531* (2021.01)
 *H01M 50/543* (2021.01)
 *H01M 50/557* (2021.01)
 *H01M 10/0525* (2010.01)

(52) U.S. Cl.
 CPC ....... *H01M 50/116* (2021.01); *H01M 50/531* (2021.01); *H01M 50/543* (2021.01); *H01M 50/557* (2021.01); *H01M 2200/00* (2013.01)

(58) Field of Classification Search
 USPC .......................................................... 429/7
 See application file for complete search history.

(56) References Cited

U.S. PATENT DOCUMENTS

| | | |
|---|---|---|
| 2014/0302384 A1 | 10/2014 | Park et al. |
| 2015/0004440 A1 | 1/2015 | Hwang |

FOREIGN PATENT DOCUMENTS

| | | |
|---|---|---|
| KR | 10-2012-0047542 A | 5/2012 |
| KR | 10-1232783 B1 | 2/2013 |
| KR | 10-1364095 B1 | 2/2014 |
| KR | 10-2015-0040444 A | 4/2015 |

Plate bending

Plate bending     Nomex tape damage     Cell damage

BATTERY CELL COMPRISING PROTECTION CIRCUIT MODULE ASSEMBLY HAVING LEAD PLATE

CROSS-REFERENCE TO RELATED APPLICATIONS

This application is a Continuation of co-pending U.S. application Ser. No. 15/812,343 filed on Nov. 14, 2017, which claims priority to Korean Patent Application No. 10-2016-0144996 filed on Nov. 2, 2016 and all the benefits accruing therefrom under 35 U.S.C. § 119, the contents of which are incorporated by reference in their entirety.

BACKGROUND

The present disclosure relates to a battery cell including a protection circuit module assembly having a lead plate.

In recent years, as the price of energy sources is increased due to depletion of fossil fuels and the interest in environmental pollution is amplified, the demand for environmentally friendly alternative energy sources becomes an indispensable factor for the future. Various researches on power generation technologies such as nuclear power, solar power, wind power, and tidal power are continuing, and electric power storage devices for more efficient use of such generated energy are also attracting much attention.

Especially, as technology development and demand for mobile devices increase, the demand for a battery as an energy source is rapidly increasing, and in recent years, the use of secondary batteries as a power source for electric vehicles (EV) and hybrid electric vehicles (HEV) has been realized and the use area has also been expanded for use as a power auxiliary power source through a grid. Therefore, many researches are conducted on the battery that can meet various demands.

Typically, there is a high demand for a prismatic secondary battery and a pouch-shaped secondary battery which can be applied to products such as mobile phones with a thin thickness in terms of the shape of the battery and there is a high demand for lithium secondary batteries, such as lithium ion batteries and lithium ion polymer batteries, which have advantages such as high energy density, discharge voltage, and output stability in terms of materials.

In particular, since aluminum laminate sheets are used as exterior members, pouch-shaped batteries are attracting much attention due to their advantages such as small weight, low manufacturing cost, and easy shape deformation.

FIG. 1 is an exploded perspective view schematically illustrating a typical structure of a typical conventional pouch-shaped secondary battery.

Referring to FIG. 1, a pouch-shaped secondary battery 10 includes a stack-type electrode assembly 20 having a plurality of electrode tabs 21 and 22 protruding therefrom, two electrode leads 30 and 31 connected to the electrode tabs 21 and 22, respectively, and a battery case 40 having a structure for receiving and sealing the stack-type electrode assembly 20 to expose a part of the electrode leads 30 and 31 to the outside.

The battery case 40 includes a lower case 42 including a concave shaped reception portion 41 into which the stack-type electrode assembly 20 can be seated, and an upper case 43 for sealing the upper case 20 as a cover of the lower case 42. The upper case 43 and the lower case 42 are thermally welded together with the stack-type electrode assembly 20 built therein to form a sealing portion (not shown) along the outer circumferential surface of the battery case.

Moreover, FIG. 2 shows photographs in which electrode leads of a battery cell according to the related art are bent and connected to a lead plate.

As shown in FIG. 2, in the prior art, the lead plate is used to electrically connect the protection circuit module and the electrode lead of the battery cell. To efficiently optimize the internal space of the battery pack, after the electrode lead is connected to the lead plate, a process of bending the electrode lead over the sealing portion of the battery case was performed.

In addition, FIG. 3 illustrates photographs showing damages of a battery cell generated during a process of connecting an electrode lead of a battery cell to a lead plate according to a related art.

As shown in FIGS. 2 and 3, in the process of bending the electrode lead, it is easy for the operator to damage the sealing part of the battery case or the receiving part for receiving the electrode assembly, so that a short circuit may be caused by the damaged part, causing ignition, or electrolyte leakage through the damaged battery case, and problems such as an anode connection may be caused.

Specifically, in the process of bending the electrode lead, since the bending force varies depending on the operator, it has been difficult to achieve uniformity of the manufacturing quality by hand.

In addition, the damaged portion of the battery case due to the bending operation of the electrode lead is not easily visible, and after the connection, defect is not found and missed during the quality inspection of inspectors on the manufacturing line.

Further, when an insulation tape is attached to an area where damage is expected in order to prevent damage from occurring in the process of bending the electrode lead, the cost of workers and auxiliary materials may be increased.

Therefore, there is a high need to develop a technique that effectively prevents damage to a battery case, which occurs during the process of bending an electrode lead, without significantly increasing the manufacturing cost.

SUMMARY

The present disclosure confirms that the damage of a battery case can be effectively prevented while minimizing the manufacturing cost without any additional member when a bent portion is formed extending from an electrode lead connection portion so as to be bent to face the outer surface of the battery case in order to prevent damage to the battery case that may occur during the process of connecting the lead electrode to the electrode lead connection portion of the lead plate.

In accordance with an exemplary embodiment, provided is a plate-shaped battery cell in which electrode leads are located at one side end portion of a battery case including an excess sealing portion of a thermally-welded or adhesive structure for sealing an electrode assembly. the battery cell includes: a Protection Circuit Module (PCM) assembly having one or more safety elements for preventing overcurrent, wherein the PCM assembly includes a PCM and a conductive lead plate for electrically connecting the electrode leads, wherein the lead plate includes: an electrode lead connection portion positioned at one side end portion of the lead plate for electrically connecting the PCM and the electrode lead; a PCM connection portion located at the other side end portion of the lead plate for connecting to a connection portion of a printed circuit board on which a protection circuit is formed; and a bent portion extending from the electrode lead connection portion to be bent to face the outer surface of the battery case in order to prevent damage to the battery case occurring during a process of connecting the electrode lead to the electrode lead connecting portion.

Accordingly, in order to prevent damage to the battery case that may occur during the process of connecting the lead electrode to the electrode lead connection portion of the lead plate of the present invention, the battery cell according to the present invention includes a bent portion extending from the electrode lead connection portion to a structure bent to face the outer surface of the battery case, so that it is possible to effectively prevent damage to the battery case while minimizing the manufacturing cost without any additional member.

In a specific embodiment, the plate-shaped battery cell has a structure in which the electrode assembly is sealed in a pouch-shaped battery case of a laminate sheet including a resin layer and a metal layer.

Specifically, the pouch-shaped battery case includes a laminate sheet including an outer resin layer made of a polymer resin having weather resistance, a metal layer having barrier properties against gas and liquid, and an inner resin layer made of a polymer resin having heat melting property, and in relation to a thickness to width on the whole, an insulating tape may be a plate-like type at an interface portion between the lead plate and the battery case in the battery cell.

In addition, the excess sealing portion may be a sealing portion formed by thermal melting of the battery case.

In a specific embodiment, the lead plate may include a main body portion formed of a strip-shaped flat plate. In addition, the electrode lead connection portion may extend from the main body portion of the lead plate and have an L shape on a plane.

Moreover, the main body portion of the lead plate may be formed with an inclined portion to form a height difference with respect to the ground. By forming the inclined portion in the lead plate in such a way, the internal space of the battery pack may be effectively utilized.

Specifically, the bent portion extends from the electrode lead connection portion in the direction in which a reception portion receiving an electrode assembly of the battery case is located, and due to such a structure, it is possible to prevent the electrode lead from contacting the reception portion of the battery case while being bent.

Also, for this, the bent portion may be bent in a shape corresponding to one side wall portion of the reception portion of the battery case.

In a specific embodiment, the electrode lead may be bent at least once so as to be connected to face the electrode lead connection portion of the lead plate. When the lead plate is positioned above the excess sealing portion of the battery case, the electrode lead positioned at the lower end thereof is bent at least once to face the electrode lead connection portion of the lead plate.

In a specific embodiment, in order to prevent damage to the battery cell due to a short or contact between the internal components of the battery pack, an insulating film may be coated on the lead plate except for the electrode lead connection portion, the PCM connection portion, and the bent portion.

In a specific embodiment, the insulating film may be made of a polyimide resin and is not necessarily limited to such a material, and may be applied to a lightweight electrically insulating polymer resin film. For example, in another embodiment, the insulating film may be made of one or more materials selected from the group consisting of polyethylene terephthalate and polypropylene.

In a specific embodiment, the end edges of the bent portion may be formed with a rounding structure. This rounding structure has an advantage that it can effectively prevent the damage of the battery case that may occur when the end edges of the bent portion contact the battery case.

In a specific embodiment, in order to reliably block the contact between the electrode lead and the battery case, the width of the bent portion may be formed to be larger than the width of the electrode lead with respect to the direction extending from the electrode lead connection portion. Specifically, the width of the bent portion may be 2 mm or more larger than the width of the electrode lead.

In a specific embodiment, the plate thickness of the bent portion may be formed to be relatively thinner than the thickness of the electrode lead. When the plate thickness of the bent portion is designed to be relatively thinner than the thickness of the electrode lead, the spot welding of the electrode lead connection portion and the electrode lead is excellent, and the bending operation is facilitated.

In a specific embodiment, the bent portion may be coated with an insulating film. With this configuration, an effect of preventing damage due to contact between the bent portion and the reception portion of the battery case may be obtained.

In a specific embodiment, in order to ensure reliable insulation between the lead plate and the electrode lead with the battery case, an insulating tape may be interposed at the interface portion between the lead plate and the battery case.

In a specific embodiment, the electrode assembly may include an anode, a cathode, and a separator structure interposed between the anode and the cathode.

The anode may be prepared, for example, by applying a mixture of an anode active material, a conductive material, and a binder on an anode current collector, followed by drying. If necessary, a filler may be further added to the mixture.

The anode active material is a material capable of causing an electrochemical reaction and includes two or more transition metals as a lithium transition metal oxide, for example, a layered compound such as lithium cobalt oxide ($LiCoO_2$) or lithium nickel oxide ($LiNiO_2$) substituted with one or more transition metals, lithium manganese oxide substituted with one or more transition metals, a lithium nickel represented by the formula $LiNi_{1-y}M_yO_2$ (where M=Co, Mn, Al, Cu, Fe, Mg, B, Cr, Zn, or Ga and including at least one element of the above elements, $0.01 \le y \le 0.7$), lithium nickel cobalt manganese composite oxide represented by $Li_{1+z}Ni_bMn_cCo_{1-(b+c+d)}MdO_{(2-e)}Ae$ (where $-0.5 \le z \le 0.5$, $0.1 \le b \le 0.8$, $0.5 \le c \le 0.8$, $0 \le d \le 0.2$, $0 \le e \le 0.2$, b+c+d<1, M=Al, Mg, Cr, Ti, Si, or Y, A=F, P, or Cl) such as $Li_{1+z}Ni_{1/3}Co_{1/3}Mn_{1/3}O_2$, $Li_{1+z}Ni_{0.4}Mn_{0.4}CO_{0.2}O_2$, and the like, and olivine-based lithium metal phosphate represented by the formula $Li_{1+z}M_{1-y}M'_yPO_{4-z}X_z$ (where M=transition metal, preferably, Fe, Mn, Co, or Ni, M'=Al, Mg, or Ti, X=F, S, or N, but is not limited thereto.

The conductive material is usually added in an amount of 1 to 20 wt % based on the total weight of the mixture including the anode active material. Such a conductive material is not particularly limited as long as it has electrical conductivity without causing a chemical change in the battery, and for example, graphite such as natural graphite or artificial graphite, carbon black such as carbon black, acetylene black, Ketjen black, channel black, furnace black, lamp black, and summer black, conductive fibers such as carbon fiber and metal fiber, metal powders such as carbon fluoride, aluminum and nickel powder, conductive whiskey such as zinc oxide and potassium titanate, conductive metal oxides such as titanium oxide, and conductive materials such as polyphenylene derivatives may be used.

The filler is optionally used as a component for suppressing the expansion of the anode, and a fibrous material is not particularly limited as long as it does not cause chemical change in the battery, and for example, olefin polymers such as polyethylene and polypropylene and fibrous materials such as glass fibers and carbon fibers are used.

In addition, the cathode may be manufactured by, for example, applying a mixture of a cathode active material, a conductive material, and a binder onto a cathode current collector and drying it, and if necessary, a filler may be further added to the mixture. Furthermore, the cathode active material may be at least one selected from the group consisting of graphite carbon, coke carbon, and hard carbon.

The present invention also provides a battery pack characterized by including at least one battery cell.

Since the configurations of the battery cells described above are well known to those skilled in the art, a detailed description thereof will be omitted herein.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Hereinafter, the contents of the present invention will be described in detail with reference to the drawings, but the scope of the present invention is not limited thereto.

Figure 1:
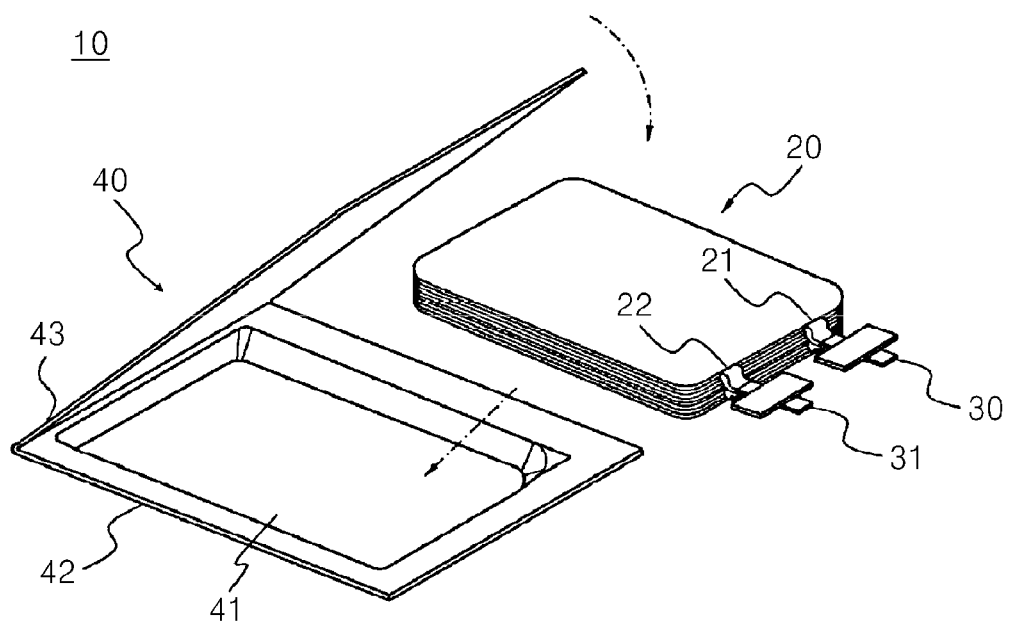
FIG. 1 is an exploded perspective view showing a general structure of a typical conventional pouch-shaped secondary battery.
Figure 2:
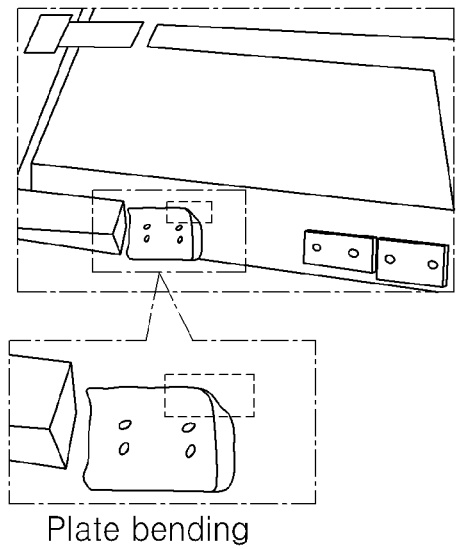
FIG. 2 shows photographs in which electrode leads of a battery cell according to the related art are bent and connected to a lead plate.
Figure 3:
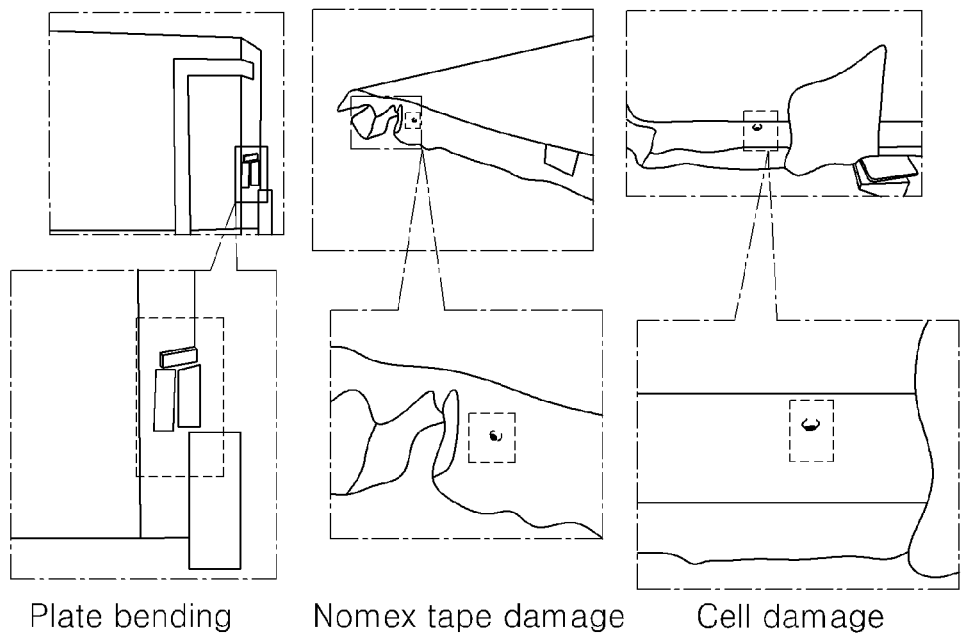
FIG. 3 illustrates photographs showing damages of a battery cell generated during a process of connecting an electrode lead of a battery cell to a lead plate according to a related art.
Figure 4:
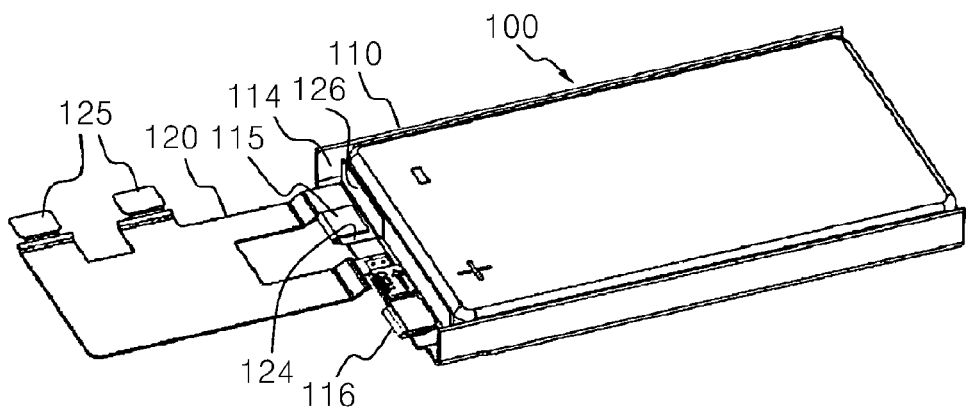
FIG. 4 is a perspective view schematically showing a battery cell where a lead plate is connected according to an embodiment of the present invention.
Figure 5:
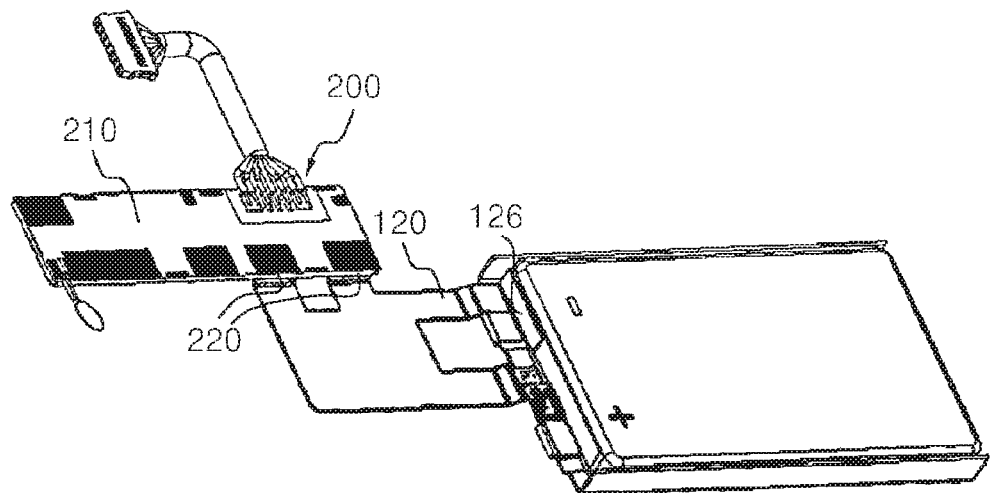
FIG. 5 is a perspective view schematically showing a battery cell including a protection circuit module assembly according to an embodiment of the present invention.

FIG. 4 is a schematic perspective view showing a battery cell to which a lead plate is connected according to an embodiment of the present invention, and FIG. 5 is a schematic perspective view showing a battery cell including a protection circuit module assembly according to one embodiment of the present invention.

Referring to FIGS. 4 and 5, a battery cell 100 according to the present invention is a plate-shaped battery cell 100 in which electrode leads 115 and 116 are located at one side end portion of a battery case 110 including an excess sealing portion 114 of a thermally-welded or adhesive structure for sealing an electrode assembly (not shown).

The battery cell 100 includes a Protection Circuit Module (PCM) assembly 200 having one or more safety elements (not shown) for preventing overcurrent. The PCM assembly 200 includes a PCM 210 and a conductive lead plate 120 for electrically connecting the electrode leads 115 and 116 to each other.

At this time, the lead plate 120 includes an electrode lead connection portion 124 positioned at one side end portion of the lead plate 120 for electrically connecting the PCM 210 and the electrode lead 115, a PCM connection portion 125 located at the other side end portion of the lead plate 120 for connecting to a connection portion 220 of the printed circuit board on which a protection circuit is formed, and a bent portion 126 extending from the electrode lead connection portion 124 to be bent to face the outer surface of the battery case 110 in order to prevent damage to the battery case 110 occurring during the process of connecting the electrode lead 115 to the electrode lead connecting portion 124.

In addition, the plate-shaped battery cell 100 has a structure in which an electrode assembly (not shown) is sealed in the pouch-shaped battery case 110 of a laminate sheet.

Figure 6:
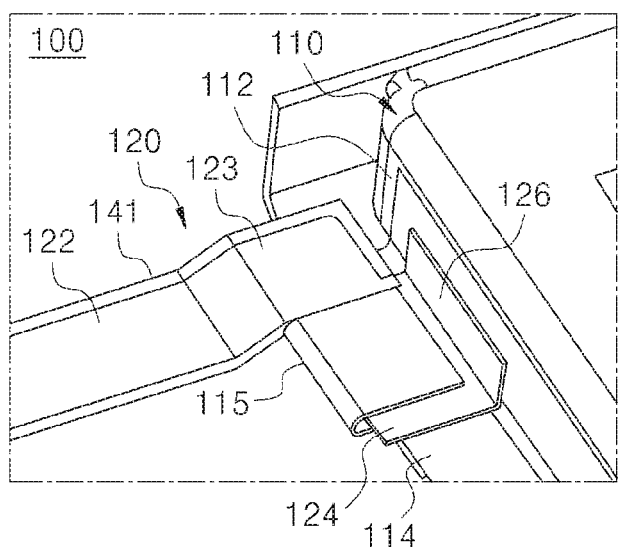
FIG. 6 is a perspective view schematically showing an enlarged portion of a battery cell according to an embodiment of the present invention.

FIG. 6 is a perspective view schematically showing an enlarged portion of a battery cell according to an embodiment of the present invention.

Referring to FIG. 6, the lead plate 120 includes a main body portion 122 formed of a strip-shaped flat plate. In addition, the electrode lead connection portion 124 extends from the main body portion 122 of the lead plate 120 and has an L shape on a plane.

Moreover, the main body portion 122 of the lead plate 120 is formed with an inclined portion 123 to form a height difference with respect to the ground. By forming the inclined portion 123 in the lead plate 120 in such a way, the internal space of the battery pack may be effectively utilized.

Furthermore, the bent portion 126 extends from the electrode lead connection portion 124 in the direction in which a reception portion 112 receiving an electrode assembly (not shown) of the battery case 110 is located, and due to such a structure, it is possible to prevent the electrode lead 115 from contacting the reception portion 112 of the battery case 110 while being bent.

Also, for this, the bent portion 126 is bent in a shape corresponding to one side wall portion of the reception portion 112 of the battery case 110.

At this time, the electrode lead 115 is bent at least once so as to be connected to face the electrode lead connection portion 124 of the lead plate 120. Moreover, when the lead plate 120 is positioned above the excess sealing portion of the battery case 110, the electrode lead 115 positioned at the lower end thereof is bent at least once to face the electrode lead connection portion 124 of the lead plate 120.

Again, referring to FIG. 6 together with FIG. 4, in order to prevent damage to the battery cell 100 due to a short or contact between the internal components of the battery pack (not shown), an insulating film 141 is coated on the lead plate 120 except for the electrode lead connection portion 124, the PCM connection portion 125, and the bent portion 126. At this time, the insulating film 141 is made of polyimide resin.

Figure 7:
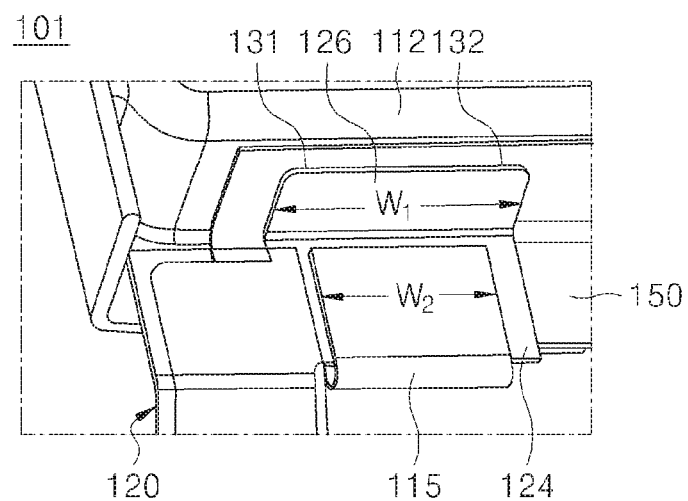
FIG. 7 is a perspective view schematically showing an enlarged portion of a battery cell according to another embodiment of the present invention.

FIG. 7 is a perspective view schematically showing an enlarged portion of a battery cell according to another embodiment of the present invention.

Referring to FIG. 7, in a battery cell 101 according to another embodiment of the present invention, the end edges 131 and 132 of a bent portion 126 of a lead plate 120 are formed in a rounding structure. This rounding structure has an advantage that it can effectively prevent the damage of the battery case 110 that may occur when the end edges 131 and 132 of the bent portion 126 contact the battery case 110.

Furthermore, in order to reliably block the contact between the electrode lead 115 and the battery case 110, the width W1 of the bent portion 126 is formed to be larger than the width W2 of the electrode lead 115 with respect to the direction extending from the electrode lead connection portion 124. Specifically, the width W1 of the bent portion 126 is 2 mm or more larger than the width W2 of the electrode lead 115.

In addition, the thickness of the bent portion 126 is formed to be relatively thinner than the thickness of the electrode lead 115.

Furthermore, in order to ensure reliable insulation between the lead plate 120 and the electrode leads 115 with respect to the battery case 110, an insulating tape 150 is interposed between the lead plate 120 and the battery case 110.

Figure 8:
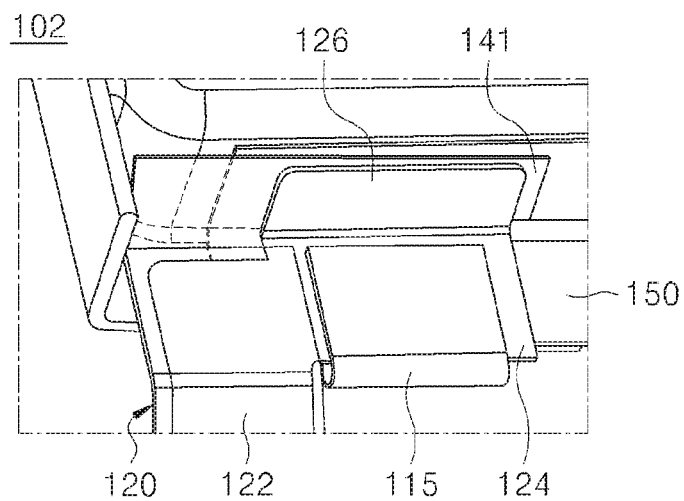
FIG. 8 is a perspective view schematically showing an enlarged portion of a battery cell according to another embodiment of the present invention.

FIG. 8 is a perspective view schematically showing an enlarged portion of a battery cell according to another embodiment of the present invention.

Referring to FIG. 8, an insulating film 141 is coated on a bent portion 126 of a lead plate 120 of a battery cell 102 according to another embodiment of the present invention. In other words, both the main body portion 122 and the bent portion 126 of the lead plate 120 are covered with the insulating film 141. With this structural feature, it is possible to effectively prevent the bent portion 126 from being damaged due to contact with the battery case 110.

Figure 9:
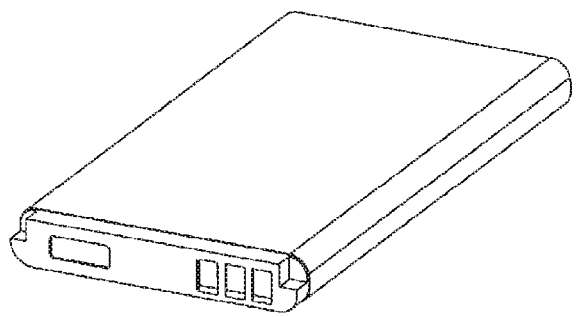
FIG. 9 is a perspective view schematically showing a battery pack according to another embodiment of the present invention.

FIG. 9 is a perspective view schematically showing a battery pack according to another embodiment of the present invention.

Referring to FIGS. 5 and 9 together, the present invention also discloses a battery pack 500 including at least one battery cell 100.

As described above, in order to prevent damage to the battery case that may occur during the process of connecting the lead electrode to the electrode lead connection portion of the lead plate of the present invention, the battery cell according to the present invention includes a bent portion extending from the electrode lead connection portion to a structure bent to face the outer surface of the battery case, so that it is possible to effectively prevent damage to the battery case while minimizing the manufacturing cost without any additional member.

Although the battery cell including a protection circuit module assembly having a lead plate has been described with reference to the specific embodiments, it is not limited thereto. Therefore, it will be readily understood by those skilled in the art that various modifications and changes can be made thereto without departing from the spirit and scope of the present invention defined by the appended claims.

What is claimed is:

1. A plate-shaped battery cell in which an electrode lead is located at one side end portion of a battery case including an excess sealing portion for sealing an electrode assembly, the battery cell comprising:
   a Protection Circuit Module (PCM) assembly having one or more safety elements for preventing overcurrent,
   wherein the PCM assembly comprises a Protection Circuit Module (PCM) and a conductive lead plate for electrically connecting the electrode lead,
   wherein the conductive lead plate comprises:
   an electrode lead connection portion positioned at one side end portion of the conductive lead plate for electrically connecting the PCM and the electrode lead;
   a PCM connection portion located at the other side end portion of the conductive lead plate for connecting to a connection portion of a printed circuit board on which a protection circuit is formed; and
   a bent portion extending from the electrode lead connection portion and bent to face the outer surface of the battery case to prevent damage to the battery case occurring during a process of connecting the electrode lead to the electrode lead connecting portion,
   wherein the electrode lead connection portion, the PCM connection portion, and the bent portion of the conductive lead plate are all conductive, and
   wherein the width of the bent portion is larger than the width of the electrode lead with respect to a direction extending from the electrode lead connection portion.

2. The battery cell of claim 1, wherein the flat thickness of the bent portion is at least the same as the thickness of the electrode lead.

3. The battery cell of claim 1, wherein the bent portion extends from the electrode lead connection portion in a direction in which a reception portion receiving the electrode assembly of the battery case is located,
   wherein the reception portion is disposed angled to the excess sealing portion.

4. The battery cell of claim 3, wherein the reception portion is disposed perpendicular to the excess sealing portion.

5. The battery cell of claim 3, wherein the bent portion is interposed between an end of the electrode lead and the reception portion.

6. The battery cell of claim 1, wherein the plate-shaped battery cell has a structure in which the electrode assembly is sealed in a pouch-shaped battery case of a laminate sheet including a resin layer and a metal layer.

7. The battery cell of claim 1, wherein the excess sealing portion is a sealing portion formed by a heat welding of the battery case.

8. The battery cell of claim 1, wherein the conductive lead plate comprises a main body portion formed of a strip-shaped flat plate.

9. The battery cell of claim 8, wherein the electrode lead connection portion extends from the main body portion of the conductive lead plate and has an L shape on a plane.

10. The battery cell of claim 8, wherein the main body portion of the conductive lead plate is formed with an inclined portion to form a height difference with respect to the ground.

11. The battery cell of claim 1, wherein the bent portion is bent in a shape corresponding to one side wall portion of a reception portion of the battery case.

12. The battery cell of claim 1, wherein the electrode lead is bent at least once so as to be connected to face the electrode lead connection portion of the conductive lead plate.

13. The battery cell of claim 1, wherein an insulating film is coated on the remaining portion of the conductive lead plate except for the electrode lead connection portion, the PCM connection portion, and the bent portion.

14. The battery cell of claim 13, wherein the insulating film is made of polyimide resin.

15. The battery cell of claim 1, wherein the end edges of the bent portion are formed in a rounding structure.

16. The battery cell of claim 1, wherein an insulating film is coated on the bent portion.

17. The battery cell of claim 1, wherein an insulating tape is interposed at an interface portion between the conductive lead plate and the battery case.

18. A battery pack comprising at least one battery cell according to claim 1.

19. A plate-shaped battery cell in which an electrode lead is located at one side end portion of a battery case including an excess sealing portion for sealing an electrode assembly, the battery cell comprising:

a Protection Circuit Module (PCM) assembly having one or more safety elements for preventing overcurrent, wherein the PCM assembly comprises a Protection Circuit Module (PCM) and a conductive lead plate for electrically connecting the electrode lead, wherein the conductive lead plate comprises:

an electrode lead connection portion positioned at one side end portion of the conductive lead plate for electrically connecting the PCM and the electrode lead;

a PCM connection portion located at the other side end portion of the conductive lead plate for connecting to a connection portion of a printed circuit board on which a protection circuit is formed; and a bent portion extending from the electrode lead connection portion and bent to face the outer surface of the battery case to prevent damage to the battery case occurring during a process of connecting the electrode lead to the electrode lead connecting portion, wherein the electrode lead connection portion, the PCM connection portion, and the bent portion of the conductive lead plate are all conductive, wherein the bent portion extends from the electrode lead connection portion in a direction in which a reception portion receiving the electrode assembly of the battery case is located, and wherein the reception portion is disposed angled to the excess sealing portion.

20. A plate-shaped battery cell in which an electrode lead is located at one side end portion of a battery case including an excess sealing portion for sealing an electrode assembly, the battery cell comprising:

a Protection Circuit Module (PCM) assembly having one or more safety elements for preventing overcurrent, wherein the PCM assembly comprises a Protection Circuit Module (PCM) and a conductive lead plate for electrically connecting the electrode lead, wherein the conductive lead plate comprises:

an electrode lead connection portion positioned at one side end portion of the conductive lead plate for electrically connecting the PCM and the electrode lead;

a PCM connection portion located at the other side end portion of the conductive lead plate for connecting to a connection portion of a printed circuit board on which a protection circuit is formed; and a bent portion extending from the electrode lead connection portion and bent to face the outer surface of the battery case to prevent damage to the battery case occurring during a process of connecting the electrode lead to the electrode lead connecting portion, wherein the electrode lead connection portion, the PCM connection portion, and the bent portion of the conductive lead plate are all conductive, and wherein the bent portion is interposed between an end of the electrode lead and a reception portion receiving the electrode assembly of the battery case.

\* \* \* \* \*